(12) United States Patent
Aliakbarian et al.

(10) Patent No.: US 11,958,672 B2
(45) Date of Patent: Apr. 16, 2024

(54) METHODS FOR EXTRACTING AND ENCAPSULATING PHENOLICS FROM FOOD WASTE

(71) Applicant: BOARD OF TRUSTEES OF MICHIGAN STATE UNIVERSITY, East Lansing, MI (US)

(72) Inventors: Bahar Aliakbarian, Midland, MI (US); Mojgan Nejad, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 52 days.

(21) Appl. No.: 17/957,018

(22) Filed: Sep. 30, 2022

(65) Prior Publication Data
US 2023/0077582 A1 Mar. 16, 2023

Related U.S. Application Data

(63) Continuation of application No. 16/796,355, filed on Feb. 20, 2020, now Pat. No. 11,485,554.
(Continued)

(51) Int. Cl.
*B65D 65/46* (2006.01)
*B01D 11/02* (2006.01)
*B65D 81/28* (2006.01)

(52) U.S. Cl.
CPC ........ *B65D 65/466* (2013.01); *B01D 11/0288* (2013.01); *B65D 81/28* (2013.01);
(Continued)

(58) Field of Classification Search
CPC .. B65D 65/466; B65D 81/28; B01D 11/0211; B01D 11/0288; Y10T 428/1352;
(Continued)

(56) References Cited

U.S. PATENT DOCUMENTS 3,816,577 A * 6/1974 Neckermann et al. ... A61L 9/01
422/5
6,151,799 A * 11/2000 Jones ...................... A23L 27/13
34/384
(Continued)

FOREIGN PATENT DOCUMENTS

| EP | 1 378 491 | | 1/2004 |
| MX | 2017009114 | * | 2/2019 |
| WO | WO2007039233 | * | 4/2007 |

OTHER PUBLICATIONS

Fang Z. et al., "Encapsulation of polyphenols—a review", *Trends Food Sci. Technol.*, 21:510-23 (2010).
(Continued)

*Primary Examiner* — Anthony J Weier
(74) *Attorney, Agent, or Firm* — MARSHALL, GERSTEIN & BORUN LLP

(57) ABSTRACT

The disclosed articles, apparatus, methods, and compositions provide for the integration of different and environmentally-friendly processes for extraction, stabilization, and formulation of active compounds with health and/or other benefits from lignocellulosic by-products of food processes. The active compounds can include one or more of polyphenols, flavonoids, o-diphenols, anthocyanins, and phenolic acids. A high-pressure, high-temperature extraction process provides a means to recover a substantial portion of the active compounds from a biomass feedstock. The corresponding extract can be encapsulated, which provides a convenient form for stabilization and delivery of the active compounds into a final product, for example an active packaging material or corresponding actively packaged food item.

20 Claims, 7 Drawing Sheets

Related U.S. Application Data

(60) Provisional application No. 62/809,472, filed on Feb. 22, 2019.

(52) U.S. Cl.
CPC ....... *B01D 11/0211* (2013.01); *B32B 2264/00* (2013.01); *B32B 2307/7145* (2013.01); *B32B 2439/70* (2013.01); *Y02E 50/10* (2013.01); *Y10T 428/1352* (2015.01)

(58) Field of Classification Search
CPC ........ B32B 2264/00; B32B 2307/7145; B32B 2439/70; Y02E 50/10
See application file for complete search history.

(56) References Cited

U.S. PATENT DOCUMENTS

| | | | |
|---|---|---|---|
| 6,544,581 B1 | 4/2003 | Shrikhande et al. | |
| 7,879,379 B1* | 2/2011 | Widmer | C12P 7/12 426/492 |
| 9,125,824 B1 | 9/2015 | Balcombe et al. | |
| 2004/0131748 A1* | 7/2004 | Allen | C07C 403/24 426/615 |
| 2005/0095332 A1 | 5/2005 | Stanley | |
| 2006/0024385 A1 | 2/2006 | Pedersen | |
| 2007/0010632 A1 | 1/2007 | Kaplan et al. | |
| 2009/0291481 A1* | 11/2009 | Hillyer | C12P 7/06 435/163 |
| 2010/0210866 A1 | 8/2010 | Toyohara et al. | |
| 2012/0237576 A1 | 9/2012 | Gordon et al. | |
| 2012/0288533 A1 | 11/2012 | Livney | |
| 2014/0142076 A1 | 5/2014 | Ahmed et al. | |
| 2014/0311099 A1 | 10/2014 | Uradnisheck | |
| 2016/0023826 A1 | 1/2016 | Edwards et al. | |
| 2017/0099859 A1 | 4/2017 | Candrawinata | |
| 2018/0290811 A1 | 10/2018 | Withers | |
| 2019/0059418 A1* | 2/2019 | DiMarzio | A23L 2/74 |
| 2020/0270039 A1 | 8/2020 | Aliakbarian et al. | |

OTHER PUBLICATIONS

Kumar K. et al., "Food waste: a potential bioresource for extraction of nutraceuticals and bioactive compounds", *Bioresour. Bioprocess.*, 4:18, pp. 1-14 (2017).

Li Y. et al., "Microwave-Assisted Extraction of Natural Antioxidants from the Exotic *Gordonia axillaris* Fruit: Optimization and Identification of Phenolic Compounds", *Molecules*, 22:1481, pp. 1-16 (2017).

Teixeira A. et al., "Natural Bioactive Compounds from Winery By-Products as Health Promoters: A Review", *Int. J. Mol. Sci.*, 15:15638-78 (2014).

Tunchaiyaphum S. et al., "Extraction of Bioactive Compounds from Mango Peels Using Green Technology", *Int. J. Chem. Eng. and Applications*, 4(4):194-98, (Aug. 2013).

Sun-Waterhouse D. et al., "Spary-Drying Microencapsulation of Polyphenol Bioactives: A Comparative Study Using Different Natural Fibre Polymers as Encapsulants", *Food Bioprocess Technol.*, 6:2376-2388 (2013).

* cited by examiner (A)

(B)

ent Ser. No. 16/796,355 (filed Feb. 20, 2020), now U.S.
METHODS FOR EXTRACTING AND ENCAPSULATING PHENOLICS FROM FOOD WASTE

CROSS-REFERENCE TO RELATED APPLICATIONS

This application is a continuation of U.S. patent application Ser. No. 16/796,355 (filed Feb. 20, 2020), now U.S. Pat. Ser. No. 11/485,554, which claims the priority benefit of U.S. Provisional Application No. 62/809,472 (filed Feb. 22, 2019), each of which is incorporated herein by reference in its entirety.

STATEMENT OF GOVERNMENT INTEREST

None.

BACKGROUND OF THE DISCLOSURE

Field of the Disclosure

The disclosed articles, apparatus, methods, and compositions provide for the integration of different and environmentally-friendly processes for extraction, stabilization, and formulation of phenolic and other active compounds from lignocellulosic by-products of food processes. A high-pressure, high-temperature extraction process provides a means to recover a substantial portion of the active compounds from a biomass feedstock. The corresponding extract can be encapsulated, which provides a convenient form for stabilization and delivery of the active compounds into a final product, for example an active packaging material or corresponding actively packaged food item.

Brief Description of Related Technology

Despite the huge progresses made in increasing food production all around the world, about half of the population in the Third World does not have access to an adequate food supply. Nowadays, food wasted by developed countries could feed the world three times over. There are many reasons to explain this, but certainly among the most important ones are food losses occurring in the post-harvest and marketing system.

Currently, waste management remains one of the most crucial problems to solve in the Western world society, and there is a pressing need to prevent and reduce food waste to make the transition to a resource efficient world. Residues from agri-food industries, including both by-products and wastes, often represent an environmental burden, either in terms of the impact of their use in low-added value products or of their disposal.

SUMMARY

Food residues, however, represent an opportunity to contribute to the economic and social benefit, because still rich in valuable compounds, which can be efficiently valorized if adequately recovered. In particular, natural antioxidants extracted from agri-food residues can be used to counteract the effects of oxidative stress, contributing to the prevention of cellular ageing, cardiovascular diseases and cancer development. Similarly, macromolecules from agri-food residues can be incorporated in food formulations to improve emulsification, oil structuring, water holding capability or as fat replacements.

The disclosure relates to the integration of different and environmentally friendly processes for extraction, encapsulation, and related products formulation. First, different agri-food residues, selected for their availability in large volumes in different periods of the year and in different region, provide an input bio-based feedstock. The bio-based feedstock can be characterized in terms of its various useful, recoverable materials, such as fibers, carbohydrates, proteins, ashes, lipids and antioxidants (e.g., phenolic compounds and carotenoids). An extraction process (e.g. high pressure/temperature, ultrasound, microwave assisted technologies, sub and supercritical fluids) can be used maximize the recovery of valuable compounds, for example based on the type of the biomass, minimum organic solvent, and the process cost. Next, recovered compounds can be stabilized using nano/micro scale encapsulation techniques. Finally, the stabilized/protected bio-active compounds, for example in encapsulated form, can be incorporated into the new products with food and biomedical applications, for example in active packaging.

An integrated process incorporating the combination of material recovery and formulation steps exploit the respective strengths of individual steps (e.g., higher selectivity and yield), while offsetting typically higher investment costs, thus providing a means for essentially complete conversion or other use of the residue into one or more useful products. The disclosure provides an industrial scale, sustainable industry platform for the food value chain to become a circular economy by valorization of the agri-food residues. The application of the high value-added materials is broad and could include use as phytopharmaceuticals, active packaging with antibacterial properties, anti-aging cosmetic formulation ingredients, and food integrators with antioxidant benefits. The processes can be applied to various fruits and other crops suffering higher post-harvest loss.

In a general aspect, the disclosure generally relates to methods for extracting and encapsulating phenolics from food waste, related compositions, and related articles. In an aspect, food process waste is extracted to form an extract including antioxidant compounds from the waste; the extract is then encapsulated to form a powder; and the powder is then incorporated into a commercial product.

The food process waste is generally a lignocellulosic biomass remaining after removal of a primary food component (e.g., juice and/or oil from a fruit, starches from a grain).

The food process waste can include fruit pomace (e.g., skin, pulp, seed, stems) and/or fruit pits. Fruit sources can include cherries, apples, apricots, peaches, grapes, olives, avocados, mangos, etc.

The extraction process can include microwave-assisted extraction and/or high-temperature/high-pressure extraction, for example using water as the primary extraction solvent (e.g., alone or in combination with a water-miscible solvent such as ethanol).

The antioxidant compounds can include phenolic compounds such as polyphenols, flavonoids, o-diphenols, anthocyanins.

One or more polysaccharides can be used for encapsulating the powder, for example inulin and/or maltodextrin, which promote bioavailability, water-solubility, and/or stability to the antioxidant compounds.

The commercial product can include an active packaging coating or film (e.g., food product film wrapper, container/cardboard coating), cosmetic or pharmaceutical formulation, and/or a functionalized food (e.g., food item with the encapsulated extract therein). The power/encapsulated extract as incorporated into a commercial product can impart one or more of antibacterial properties, anti-inflammatory properties, and lipid peroxidation properties to the commercial product.

The extract residue (i.e., remaining food process waste after extraction of the antioxidant compounds) can be pyrolyzed or otherwise treated according to one or more lignocellulosic treatment techniques to form gas or liquid biofuels.

In an aspect, the disclosure relates to a method for extracting active compounds from a food process waste, the method comprising: (a) providing a feed slurry comprising (i) a liquid medium comprising water and (ii) a solid food process waste dispersed in the liquid medium, the solid food process waste comprising an active compound selected from the group consisting of polyphenols, flavonoids, o-diphenols, anthocyanins, phenolic acids, and combinations thereof; (b) subjecting the feed slurry to a temperature above 100° C. at a pressure sufficiently high to prevent boiling of the liquid medium for a time sufficient to extract the active compound from the solid food process waste and into the liquid medium; and (c) separating solid food process waste from the liquid medium containing the active compound, thereby forming an extract (or a food process waste extract) comprising the liquid medium and the active compound dissolved therein.

In another aspect, the disclosure relates to other steps in an integrated process, for example including one or more of (e) forming an encapsulated food process waste extract powder by encapsulating the active compound (e.g., as extracted) with an encapsulating matrix; (f) forming an active food packaging material by incorporating the encapsulated food process waste extract powder into a food-safe polymer matrix; and (g) forming an actively packaged food item by packaging a food item in the active food packaging material. Any of the foregoing steps (e), (f), and/or (g) can be performed alone or in combination, for example in combination with any of the foregoing steps (a), (b), and/or (c). In such case, the extraction process of step (b) can include the high-pressure, high-temperature process described above, or it can be a conventional extraction process.

In a refinement, the liquid medium further comprises a water-miscible organic solvent.

In a refinement, the food process waste comprises at least one of pomace and pits from a fruit selected from the group consisting of cherries, apples, apricots, peaches, grapes, olives, avocados, mangos, tomatoes, carrots, citrus fruits, bananas, agave, and combinations thereof.

In a refinement, the solid food process waste is in powder form having a size less than 420 μm.

In a refinement, the solid food process waste is present in the feed slurry in an amount in a range from 5 wt. % to 50 wt. %.

In a refinement, the extract has a total polyphenolic (TPP) recovery in a range of 0.2 wt. % to 8 wt. %, expressed on a basis of gallic acid equivalents (GAE) per dry weight of original solid food process waste. Alternatively or additionally, the extract can have a total flavonoid (TF) recovery in a range of 0.2 wt. % to 8 wt. %, expressed on a basis of catechin equivalents (CE) per dry weight of original solid food process waste.

In another aspect, the disclosure relates to an encapsulated food process waste extract powder comprising: (a) an encapsulating matrix comprising an oligosaccharide selected from fructooligosaccharides (FOS) (e.g., inulin), galactooligosaccharides (GOS) and combinations thereof; and (b) an active compound within and distributed throughout the encapsulating matrix, the active compound being selected from the group consisting of polyphenols, flavonoids, o-diphenols, anthocyanins, phenolic acids, and combinations thereof. In an embodiment, the encapsulating matrix comprises inulin as the encapsulating oligosaccharide. The extract that is encapsulated can be obtained by any of the foregoing methods.

In a refinement, the encapsulating matrix further comprises an additional encapsulating material other than the oligosaccharide (e.g., other than inulin). For example, the encapsulating matrix can contain the oligosaccharide in an amount in a ranging from 10 wt. % to 90 wt. % and/or the additional encapsulating material in an amount in a ranging from 10 wt. % to 90 wt. %, relative to the weight of the encapsulating matrix. In a particular refinement, the additional encapsulating material comprises maltodextrin.

In a refinement, the active compound is selected from the group consisting of polyphenols, flavonoids, anthocyanins, and combinations thereof.

In a refinement, the active compound comprises a food process waste extract from a fruit selected from the group consisting of cherries, apples, apricots, peaches, grapes, olives, avocados, mangos, tomatoes, carrots, citrus fruits, bananas, agave, and combinations thereof.

In a refinement, the powder has an average size in a range of 1 μm to 500 μm or 10 μm to 100 μm.

In a refinement, the active compound is present in the powder in an amount ranging from 0.1 wt. % to 10 wt. % or 1 wt. % to 5 wt. %, relative to the weight of the powder.

In a refinement, the powder exhibits at least one of antioxidant activity, antibacterial activity, and anti-inflammatory activity.

In another aspect, the disclosure relates to an active food packaging material comprising: (a) a food-safe polymeric matrix; and (b) an encapsulated food process waste extract powder within and distributed throughout the polymeric matrix, the powder comprising an active compound selected from the group consisting of polyphenols, flavonoids, o-diphenols, anthocyanins, phenolic acids, and combinations thereof. The encapsulated food process waste extract powder can be according to any of the variously disclosed embodiments.

In a refinement, the polymeric matrix comprises a polymer selected from polylactic acid (PLA or PLLA), polyethylene terephthalate (PET), high-density polyethylene (HDPE), low-density polyethylene (LDPE), polypropylene (PP), polycarbonate (PC), polystyrene (PS), polyvinyl chloride (PVC), and combinations thereof.

In a refinement, the encapsulated food process waste extract powder comprises (i) an encapsulating matrix comprising an oligosaccharide selected from fructooligosaccharides (FOS), galactooligosaccharides (GOS) and combinations thereof and, (ii) the active compound within and distributed throughout the encapsulating matrix. In other refinements, the encapsulated powder can be free from such encapsulating oligosaccharides, for example using one or more conventional encapsulating matrix materials such as maltodextrin or otherwise.

In a refinement, the active food packaging material is in the form of a fiber.

In a refinement, the active food packaging material is in the form of a film.

In another aspect, the disclosure relates to an actively packaged food item comprising: (a) a food item; and (b) an active food packaging material according to any of the disclosed embodiments in contact with the food item. In a refinement, the food item is selected from the group consisting of meats (e.g., beef, poultry, fish, pork, sausage), fruits, vegetables, cheeses, and combinations thereof.

While the disclosed articles, apparatus, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
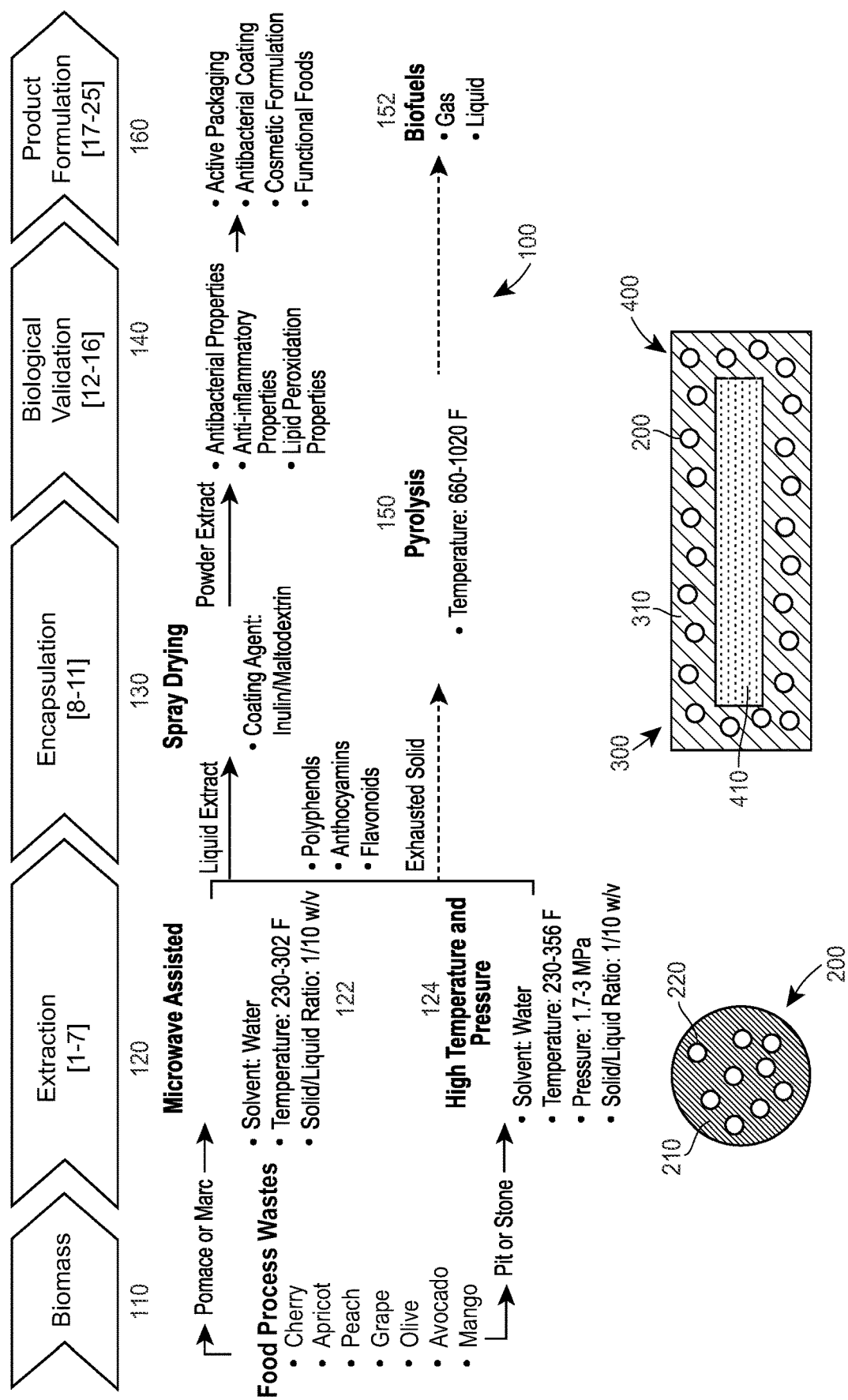
FIG. 1 illustrates an integrated, flexible processing platform 100, an encapsulated extract powder 200, an active packaging material 300, and an actively packaged food item 400 according to the disclosure.

The disclosed articles, apparatus, methods, and compositions provide for the integration of different and environmentally-friendly processes for extraction, stabilization, and formulation of different products with health and/or other benefits from lignocellulosic by-products of food processes. A particular aspect relates to the use of cherry by-products (e.g., pomace and pit), but disclosure more generally relates to the use of lignocellulosic or other biomass, for example that which remains after removal of a primary food or other use component of the biomass, such juice and/or oil from a fruit, starches from a grain, etc. The combination into an integrated process exploits the respective strengths of individual process (higher selectivity and yield), while compensating the weaknesses (high investment costs), pursuing the concept of "total use" of the residue.

By-products and wastes from the food and agriculture industries such as cherry, berry, apple, grape, orange, etc. represent an environmental burden in terms of disposal or used as source of energy in their lowest value. For example, in cherry process cherry pomace can reach 15-28% of the initial fruit, depending on the process used and cherry pit accounts for 7-15% of the whole fruit. However, these lignocellulosic biomasses are rich in valuable intracellular compounds, such as polyphenols with antioxidant properties, that represent an opportunity to bring economic and social benefits once recovered and efficiently valorized.

As noted above, waste management remains a pressing problem, in particular in Western society, and there is a need to prevent and reduce food waste to make the transition to a resource efficient world. The disclosure provides an integrated processing platform for valorization of lignocellulosic by-products from food processes, for example cherry by-products (pomace and pit), providing an advance toward a circular economy with respect to particular food products as well as agricultural products more generally. Products obtains from such lignocellulosic by-products can include high-valued products with antioxidant properties including active packaging, antibacterial coatings, nutritional supplements, and functional foods, among others.

The disclosure provides an industrial-scale platform for the food value chain to become a circular economy by valorization of the lignocellulosic residues. The application of the value-added products recovered from lignocellulosic by-products of food processes (e.g. cherry pomace and pit or otherwise) is broad and can include phytopharmaceuticals, active packaging with antibacterial properties, anti-aging cosmetic formulation ingredients, biomaterials with anti-inflammatory properties, and food integrators with antioxidant benefits. Different steps in this platform include extraction and stabilization processes, which are based on environmentally-friendly approaches using a minimum quantity of organic solvents. The platform is flexible and can be extended to different variety of fruits and crops suffering higher post-harvest loss. For example, different agri-food residues coming from processing of apple, berries, grape, orange, olive, corn, and different lignin samples from different resources (hardwoods, softwoods and annual crops) can be selected for their availability in large volumes in different periods of the year and in different region can be used. Accordingly, a single processing installation can process agri-food residues from different feedstocks (e.g., from different foods or plants) throughout a yearly cycle, thus providing process efficiency resulting from essentially continuous operation instead of sporadic or seasonal operation.

This flexible platform has important environmental, economic, and social impacts. The processing platform reduces the environmental burden of agri-food residues through the implementation of a "total use" approach to the produced biomass, for example by unlocking or otherwise recovering all of the value-added intracellular components of the biomass. The process is able to treat different types of residues available at different times and locations during the year. The processing platform also provides for economic operation of processing plants or other installation. Non-conventional extraction techniques typically require significant investment costs. A large capital expenditure can be offset if lower operating costs and larger revenues than conventional processes are achieved, which in turn means higher selectivity or yield, and hence greener processes and reduced use of organic solvents. However, also another significant economic impact derives from the provision of naturally-derived products, particularly in the field of food ingredients and additives. Natural, abundant low-cost sources (e.g., agri-food residues) provide a feedstock for the production of value-added products with significant health benefits, such as food texturizers, rheology modifiers, preservatives, antibacterial additives as well as compounds with health beneficial properties, to meet consumer demand for greener products and cleaner labels.

FIG. 1 illustrates an integrated, flexible processing platform 100 according to the disclosure, in particular for recovery and stabilization of useful biobased compounds such as bioactive compounds with antioxidant properties. Lignocellulosic by-products from various food industries provide a biobased feedstock 110 for the process. The feedstock 110, whether from cherry by-products (e.g., pomace and pit) of lignocellulosic by-products can be characterized for its basic chemical composition (e.g., fibers, carbohydrates, antioxidants, proteins, ashes, lipids) and its content of potentially toxic compounds for human consumption (mycotoxins, pesticides, heavy metals). The feedstock 110 characterization of content and extractability of the main compounds (fibers, carbohydrates, proteins, ashes, lipids and antioxidants, i.e. phenolic compounds and carotenoids) can be carried out by solid-liquid extraction at room temperature using ethanol and water as the extraction solvent.

The feedstock 110 is then extracted 120 to maximize the recovery of valuable compounds with antioxidant properties (e.g., polyphenols, flavonoids, o-diphenols, anthocyanins) or other favorable properties, for example where a particular extraction 120 process can be used based on the type of the biomass (e.g., pomace or pit) forming the feedstock 110. Example extraction 120 process include a microwave-assisted extraction 122 and/or a high pressure/high temperature extraction 124, for example using water as a solvent. Such hydrothermal processing techniques can fractionate the lignocellulosic biomass, and the liquors obtained can contain sugar oligomers, sugar degradation products, organic acids, extractives, phenolics, etc. The extraction techniques provide a high recovery of antioxidant or other useful compounds while reducing or eliminating the use of organic solvents and reducing process cost. Extracted compounds can then be encapsulated 130, for example to provide a micro- or nano-scale product. Encapsulation 130 can be performed using a spray dryer with any desired coating agent, for example a combination of inulin (which has prebiotic properties) and maltodextrin as combined coating agents. The encapsulated compounds in the form of powder have enhanced bioavailability, water solubility, and stability, and they are easy to handle and store. Biomass remaining after extraction 120 (e.g., material other than that used for encapsulation) can be subsequently treated 150, for example by pyrolysis, to form a biofuel material 152 in liquid and/or gas form.

The encapsulated material 130 can be used in a variety of ways. The encapsulated material 130 can be analyzed or characterized 140 for one or more of its antimicrobial or antibacterial properties, its anti-inflammatory properties, and its lipid peroxidation properties. Antimicrobial properties of a given encapsulated material 130 can be tested on gram-positive bacteria (e.g., *B. subtilis*), gram-negative bacteria (e.g., E. cob), and/or filamentous fungi (e.g., *A. niger*). Different feedstocks 110, whether from different or the same types of plants, can exhibit variability in their extract components and corresponding properties of the encapsulated material 130, so characterization can be used to select a desired subsequent use of the encapsulated material 130. For example, the encapsulated material 130 can be incorporated into a variety of different end-use products 160, such as an active packaging for food, an antibacterial coating, a cosmetic formulation, a pharmaceutical formulation, a nutraceutical formulation, a functional food, or otherwise.

Incorporation of the encapsulated material 130 into an active food packaging product 160, whether for fresh or processed foods, offers several advantages that include prolonging their shelf-life, enhancing safety and sensory properties, while maintaining the quality of the products, and reducing losses from unsaleable products in the supply chain. Encapsulated antioxidants with antimicrobial properties can be directly incorporated into a polymer (e.g., polylactic acid (PLA)) solution, and electrospinning or other processing technique can be used to fabricate functionalized scaffold including the polymer as a matrix with the encapsulated material 130 distributed throughout the matrix (e.g., as a composite structure). Various parameters influencing the release profile of antioxidants such as the concentration and nature of the bio-actives, the surface areas, and the three-dimensional structure of scaffold, or the thickness of the scaffold, and other physical properties of the polymers, such as crystallinity, molecular weight, and molecular weight distribution, etc. can be characterized as well as the physical and antimicrobial properties of the food packaging material. The encapsulated material 130 additionally can be incorporated into an antibacterial coating product 160. For example, encapsulated 130 antioxidants can be used to formulate a water-resistant, sustainable coating for application in linerboards and other paper-based containers.

In an aspect, the disclosure relates to a method for extracting active compounds from a food process waste. An initial feed to the extraction method is generally in the form of a feed slurry having an aqueous liquid medium and a solid food process waste dispersed in the liquid medium. The solid food process waste includes one or more active compounds to be recovered by the extraction process, such as polyphenols, flavonoids, o-diphenols, anthocyanins, and/or phenolic acids. The feed slurry is then extracted at high temperature and high pressure conditions to extract the active compound from the solid food process waste and into the liquid medium. Typical temperatures are above 100° C., and the pressures are selected to be sufficiently high to prevent boiling of the liquid medium during extraction. After extraction of the active compounds into the liquid medium, residual solids (e.g., remaining food process waste) are separated from the liquid medium to form an extract (or a food process waste extract) with the liquid medium and the active compound dissolved therein.

The active compound can include phenolic compounds or other compounds with antioxidant and/or antibacterial activity. For example, the active compound can include one or more of polyphenols, flavonoids, o-diphenols, anthocyanins, phenolic acids, etc. The active compound often can include a mixture of different such materials, depending upon the particular natural source of the materials (e.g., specific fruit or other food source for the food process waste), where a given natural source can have a characteristic mixture of active compounds that can be extracted. Polyphenolic compounds can be divided to subgroups such as flavonoids, stilbenes, lignans and phenolic acids. Examples of phenolic acids include gallic acid, caffeic acid, vanillic acid, and p-cumaric acid. Polyphenolic and other active compounds are present in several edible and non-edible food sources such as different types of fruits, vegetables and seeds. Polyphenolic compounds generally include a plurality of phenol structural units, for example one or more of catechol, pyrocatechol, resorcinol, pyrogallol, and phloroglucinol units, which can be joined by ester bonds, carbon-carbon bonds, etc. Flavonoids as a type of polyphenolic compound can further include bioflavonoids, isoflavonoids, and neoflavonoids. Flavonoids include oxygen-containing heterocyclic structures typically with one or more ketone groups thereon and//or one or more hydroxy groups thereon (i.e., as a phenolic hydroxy group). Examples of flavonoids include anthocyanidins (e.g., cyanidin, delphinidin, malvidin, pelargonidin, peonidin, petunidin), flavones (e.g., luteolin, apigenin, tangeritin), flavonols (e.g., quercetin, kaempferol, myricetin, fisetin, galangin, isorhamnetin, pachypodol, rhamnazin, pyranoflavonols, furanoflavonols), flavanones (e.g., hesperetin, naringenin, eriodictyol, homoeriodictyol), flavanonols (e.g., taxifolin (or dihydroquercetin), dihydrokaempferol), and flavans (e.g., catechin, gallocatechin, catechin 3-gallate, gallocatechin 3-gallate, epicatechins, epigallocatechin, epicatechin 3-gallate, epigallocatechin 3-gallate). Anthocyanins generally include glycosides of anthocyanidins, such as those mentioned above, typically including 3-glucosides of various anthocyanidins.

Extraction is suitably performed in a pressure vessel, for example in a batch, semi-batch, continuous, single-stage, and/or multi-stage operation. Extraction temperatures can be selected based on the particular materials being extracted, for example at an elevated temperature to facilitate extraction efficiency without exceeding a degradation temperature of the active compounds of interest in the extracted material. Suitable extraction temperatures can be at least 100, 120, 140, 160, or 180° C. and/or up to 140, 160, 200, 220, or 250° C. The pressure is not particularly limited, but the extraction should performed at an elevated (above atmospheric) pressure that is sufficient to prevent boiling and maintain the liquid medium in liquid form. The total extraction time (or residence time for a continuous process) is not particularly limited, with longer times generally providing a closer approach to equilibrium between the liquid medium and solid food process waste, thereby improving extraction efficiency.

After extraction, the extracted (spent) solid food process waste can be separated from the liquid medium including the extracted active compound by any suitable means, for example by filtering, decanting, centrifuging, etc. The solid food process waste can be re-extracted with a fresh liquid medium to increase net recovery of active compounds. The final extract can be used as is, or it can be concentrated by water/solvent removal (e.g., via heating, evaporation, etc.). Depending on the amount of water/solvent removal, the final product can be a liquid concentrate (e.g., with at least some of the original liquid medium present) or a solid mixture of extracted active compounds (e.g., with removal of substantially all of the original liquid medium.) The extract in its various forms can then be encapsulated as described below, such as by spray drying.

In some embodiments, the active compound preparation (e.g., the extract) may be further fractionated and separated for the purpose of isolating one or more pharmaceutically relevant active agents from the mixture. In one embodiment this an antimicrobial compound, such as quercetin. In another embodiment, the pharmaceutically active agent is an anti-inflammatory. Such compounds may be enriched and, optionally, isolated in pure form using one or more additional extraction or separation steps such as chromatography, crystallization, distillation, precipitation and other methods well known in the art of compound isolation from biological sources.

In addition to water, the aqueous liquid medium can further include an organic solvent, for example water-miscible organic solvent. Suitable co-solvents with the water can be selected based on their ability to solvate extractable active compounds in general or to solvate particular active compounds in the food waste. Lower alcohols such as methanol, ethanol, n-propanol, isopropanol, n-butanol, isobutanol, tert-butanol, etc. can be used. Other solvents such as hexane and acetic acid also can be used. The liquid medium can contain any desired amount of water, but the amount suitably is at least 10, 20, 30, 40, 50, 60, or 70 wt. % and/or up to 30, 40, 50, 60, 70, 80, or 90 wt. %. relative to the total liquid/solvent content in the liquid medium (i.e., excluding the weight of food process waste or other components in the feed slurry. Likewise, the amount of any co-solvent(s) suitably is at least 10, 20, 30, 40, 50, 60, or 70 wt. % and/or up to 30, 40, 50, 60, 70, 80, or 90 wt. %. relative to the total liquid/solvent content in the liquid medium suitably is at least 10, 20, 30, 40, 50, 60, or 70 wt. % and/or up to 30, 40, 50, 60, 70, 80, or 90 wt. %. relative to the total liquid/solvent content in the liquid medium.

The food process waste is not particularly limited in terms of its form or source biomass, but it suitably can be in the form of pomace and/or pits. The food process waste remaining after removal of a primary food component such as juice and/or oil from a fruit is typically in the form of fruit pomace (e.g., skin, pulp, seed, stems) and/or fruit pits. Such waste material generally contains one or more active compounds (e.g., polyphenols, anthocyanins) that are characteristic of the fruit or other food material (e.g., grain) from which it is derived, for example based on the specific active compounds and their relative amounts. The active compounds, once recovered in the food process waste extract, can include the same characteristic active compounds corresponding to the food process waste feedstock. Examples of suitable source foods for the food process waste include cherries, apples, apricots, peaches, grapes, olives, avocados, mangos, tomatoes, carrots, citrus fruits (e.g., oranges, grapefruits, lemons, limes, etc.), bananas, agave (e.g., including by-products of tequila production), etc. Another suitable source food for the food process waste includes coffee, for example coffee berries, beans, and/or grounds (e.g., pre- or post-brewing), which can be a source of antioxidant and other active compounds often distinct from those derived from fruits and vegetables.

The solid food process waste can be present in any suitable form or amount in the feed slurry. In an embodiment, the solid food process waste can be in a powder form (e.g., as a result of grinding or otherwise), for example having a particle size less than 420 μm (e.g., a 40-mesh pass powder with a maximum size of 420 μm for its particle size distribution). Smaller powder sizes can be used to increase the surface-to-mass (or surface-to-volume) ratio of the powder and increase solid-liquid mass transfer and extraction efficiency. In some embodiments, the powder can have a particle size above that retained on an 80, 100, 120, or 140-mesh screen. For example, particle sizes can be at least about 100, 120, 150, or 170 μm and/or up to about 300, 360, 420, 450, or 500 μm. In an embodiment, the solid food process waste can be present in the feed slurry in an amount in a range from 5 wt. % to 50 wt. % or 10 wt. % to 30 wt. %. For example, the solid food process waste can be at least 5, 10, 15 or 20 wt. % and/or up to 20, 30, 40, or 50 wt. % of the feed slurry.

The extraction process, in particular the high-pressure/high-temperature (HPHT) process, is particularly effective at extracting a substantial amount of the available active compounds in a given food process waste or other biomass feedstock. Compared to a conventional extraction technique, for example one performed at about room temperature (e.g., 20-30° C. or about 25° C.), the extraction process according to the disclosure can extract and recover at least 2, 3, or 5 and/or up to 6, 8, 10, 12, or more times active compounds, whether considered for single active compounds individually or multiple active compounds collectively. In some embodiments, the extract resulting from the process can have a total polyphenolic (TPP) recovery in a range of 0.2 wt. % to 8 wt. %, expressed on a basis of gallic acid equivalents (GAE) per dry weight of original solid food process waste, for example a TPP recovery of at least 0.2, 0.5, 1, 2, or 4 wt. % and/or up to 1, 2, 3, 4, 5, 6, or 8 wt. %. Similarly, in some embodiments, the extract resulting from the process can have a total flavonoid (TF) recovery in a range of 0.2 wt. % to 8 wt. %, expressed on a basis of catechin equivalents (CE) per dry weight of original solid food process waste, for example a TF recovery of at least 0.2, 0.5, 1, 2, or 4 wt. % and/or up to 1, 2, 3, 4, 5, 6, or 8 wt. %. Alternatively or additionally, the extraction efficiency can be expressed in terms of the fraction of active compound present in the original solid food process waste or biomass feedstock that is recovered in the extract. Suitably, at least 70, 80, 85, 90, or 95 wt. % and/or up to 90, 95, 98, or 99 wt. % of the active compound can be recovered in the extract. The foregoing ranges can apply to recoveries of individual active compounds and/or to multiple active compounds collectively (e.g., TPP or TF recovered based on TPP or TF original present in the feedstock).

In an aspect and as further shown in FIG. 1, the disclosure also relates to an encapsulated food process waste extract powder 200. An encapsulating matrix 210 for the powder includes an encapsulating oligosaccharide a fructooligosaccharide (FOS) (e.g., inulin) and/or a galactooligosaccharide (GOS). The powder 200 further includes an active compound 220, for example those obtained in an extract by any of the foregoing methods. The active compound can include one or more polyphenols, flavonoids, o-diphenols, anthocyanins, phenolic acids, etc. as described above. The active compound 220 is contained within and is generally distributed throughout the encapsulating matrix 210. As particularly illustrated in FIG. 1, the active compound 220 can be present in discrete locations throughout the matrix 210, for example when the active compound is relatively water-insoluble. When the active compound 220 is relatively water-soluble, the active compound 220 can be more homogeneously distributed throughout the matrix 210.

The encapsulating oligosaccharide can include a fructooligosaccharide (FOS) such as inulin and/or a galactooligosaccharide (GOS). Inulins and other encapsulating oligosaccharides can include naturally occurring polysaccharides produced by various plants, and they serve as dietary fibers. Inulins can be classified as fructans or fructose polymers/oligomers, generally having a fructosyl backbone (linked by beta(2,1) bonds) and terminating glucosyl groups. Inulins and other encapsulating oligosaccharides typically have a degree of polymerization in a range of 2 to 60, for example at least 2, 4, 6, 8, 10, 15, or 20 and/or up to 4, 8, 12, 16, 20, 40, or 60. Inulins and other encapsulating oligosaccharides have a relatively low solubility in water, which can be beneficial for the encapsulating matrix, for example when a delayed release of the active compound is desired, which release can take place in an aqueous or otherwise water-containing environment (e.g., after ingestion). The inulin or other encapsulating oligosaccharide can be blended with other encapsulating matrix materials to control or select the degree of delayed release, for example when such other materials have a relatively higher degree of water solubility. Inulins and other encapsulating oligosaccharides can be prebiotics, which can be particularly useful when the encapsulated extract powder is intended for ingestion. Thus, the properties of such encapsulating oligosaccharides provide a particularly suitable encapsulating material for powders according to the disclosure, because, in addition their structural encapsulating function, they also serve to control the release rate of the active compound and induce the growth or activity of beneficial microorganisms in a user based on their prebiotic properties.

The encapsulated powder can be formed from the matrix material(s) and active compound(s) by any desired method. Spray drying is a suitable method. Spray drying generally involves preparation of a liquid mixture or slurry of the matrix material(s) and active compound(s), for example with water. The mixture is atomized and heated (e.g., with hot air) evaporate the liquid medium and provide the encapsulated powder product. The powder typically has a composite-type structure, with the encapsulating material generally forming a continuous matrix and the active compound(s) being distributed throughout the matrix, for example as a discrete or separate phase. Other suitable formulation methods include powder formulation methods (e.g., freeze drying, supercritical fluid atomization) and suspension formulation methods (e.g., layer-by layer (LBL) electrostatic self-assembly encapsulation, nanoliposome encapsulation).

In some embodiments, the encapsulating matrix further includes one or more additional encapsulating materials other than the fructooligosaccharide (FOS) and galactooligosaccharide (GOS) discussed above. Other encapsulating materials that can be used in combination with the above encapsulating oligosaccharide are not particularly limited. Suitable additional materials can be selected to promote or otherwise control bioavailability of the active compound, degree of water-solubility for the encapsulating matrix, and/or stability to the active compound. Examples of additional encapsulating material include polysaccharides such as a starch, a modified starch, a dextrin such as maltodextrin, cyclodextrin, etc., a gum such as gum arabic, guar gum, xanthan gum, agar, etc., chitosan, and pectin, In some alternative embodiments, the encapsulating matrix need not contain encapsulating oligosaccharide such as FOS or GOS, for example being free from such encapsulating oligosaccharides. In such cases, the encapsulating matrix can include any suitable materials, such as the foregoing polysaccharides or otherwise.

When present, the additional encapsulating materials and the encapsulating oligosaccharides can be present in any suitable relative amounts. For example, the encapsulating matrix can contain any desired amount of encapsulating oligosaccharides such as inulin or otherwise, but the amount suitably is at least 10, 20, 30, 40, 50, 60, or 70 wt. % and/or up to 30, 40, 50, 60, 70, 80, or 90 wt. %. These amounts are relative to the combined amount of all matrix materials (e.g., including other polysaccharides such as maltodextrin), excluding the amount of the active compound(s). Accordingly, matrix materials other than the encapsulating oligosaccharides can be present in amount of at least 10, 20, 30, 40, 50, 60, or 70 wt. % and/or up to 30, 40, 50, 60, 70, 80, or 90 wt. %, such as for all additional matrix materials combined, when more than one additional matrix material is combined with the inulin. The particular amount of encapsulating oligosaccharide can be selected as desired based on a balance of release properties, encapsulation efficiency, particle size, etc.

The encapsulated powder suitably has an average particle size in a range of 1 μm to 500 μm or 10 μm to 100 μm, for example based on a weight-, volume-, or number-average. Sizes under 50 μm are desirable to increase the surface-to-volume ratio and promote mass transfer/release of the active compound from the powder. In various embodiments, the average particle size of the encapsulated powder can be at least 1, 2, 5, 10, 15, or 20 μm and/or up to 20, 30, 40, 50, 60, 80, 100, 150, 200, or 500 μm.

In various embodiments, the active compound can be present in the powder in an amount ranging from 0.1 wt. % to 10 wt. % or 1 wt. % to 5 wt. %, relative to the weight of the powder. For example, the active compound can be present in an amount of at least 0.1, 0.2, 0.5, 1, or 2 wt. % and/or up to 1, 2, 3, 5, 7, or 10 wt. %. The foregoing ranges can apply to the amounts of individual active compounds and/or the combined amount of all active compounds in the encapsulated powder. Likewise, the powder can suitably include a complementary amount of 90 wt. % to 99.9 wt. % or 95 wt. % to 99 wt. % of encapsulating matrix materials, for example including the combined amount of encapsulating oligosaccharides and/or other encapsulating materials.

In various embodiments, the encapsulated powder can exhibit one or more of antioxidant activity, antibacterial activity, and anti-inflammatory activity. Such activity can derive from the active compound or mixture of active compounds in the encapsulated powder, for example once released from the encapsulating matrix.

In another aspect and as further shown in FIG. 1, the disclosure relates to an active food packaging material 300. The packaging material 300 includes a food-safe polymeric matrix 310 and an encapsulated food process waste extract powder 200. The encapsulated food process waste extract powder 200 can be according to any of the variously disclosed embodiments. The powder 200 is contained within and is generally distributed throughout the polymeric matrix 310. The powder 200 contains any of the active compounds 220 discussed above. In some embodiments, the encapsulating matrix 220 of the powder 200 can include an encapsulating oligosaccharide (e.g., inulin). In other embodiments, the encapsulating matrix 220 of the powder 200 is free from such encapsulating oligosaccharides. In some embodiments, the incorporated powder 200 can enhance the properties of the packaging material 300, for example antibacterial properties of the packaging material 300. In some embodiments, the incorporated powder 200 can serve as a filler that alternatively or additionally enhances the physical, mechanical, and/or biodegradability properties of the packaging material 300.

The polymeric matrix material is not particularly limited, and it generally can include any material that is safe for contact with a food item intended for human consumption, for example GRAS materials. Examples of suitable polymers include polyolefins or other vinyl polymers, polyesters, etc., for example including polylactic acid (PLA or PLLA), polyethylene terephthalate (PET), high-density polyethylene (HDPE), low-density polyethylene (LDPE), polypropylene (PP), polycarbonate (PC), polystyrene (PS), and/or polyvinyl chloride (PVC).

In various embodiments, the active food packaging material is in the form of a fiber. The fiber can be formed by any suitable process known in the art, for example a spinning process such as electrospinning. Other suitable processes include wetspinning, interfacial complexation, microfluidic spinning, and meltspinning (extrusion). Electrospinning as a general process uses electric force to draw charged threads of polymer solutions or polymer melts. Such polymer solutions or melts include the encapsulated powder dispersed in the continuous liquid phase during the electrospinning process such that the fiber typically has a composite-type structure, with the polymer material generally forming a continuous matrix and the encapsulated powder being distributed throughout the matrix, for example as a discrete or separate phase. Electrospinning for fiber-based film fabrication is particularly suitable because it allows effective control over the morphology of the generated constructs. For example, electrospinning for packaging applications permits encapsulation of active agents (e.g., the encapsulated powder with active compound(s)) within the fiber to form a coating of nonwoven fibrous matrix.

The fiber diameter is not particularly limited, for example being in a range of 0.2 μm to 10 μm or 0.5 μm to 5 μm. In various embodiments, the fiber diameter is at least 0.2, 0.5, 1 or 2 μm and/or up to 2, 3, 5, 7 or 10 μm, for example representing a range of diameters in a distribution or an average diameter (e.g., number-, weight-, or volume-average). In some embodiments, fibers having different (average) diameters can be used to provide different release properties or mechanical properties to the packaging material, as described below. For example, at least two sets of fibers having different average diameters can be used, such as where the average diameters are different by at least 0.2, 0.5, 1 or 2 μm and/or up to 1, 2, 3, 4, 6, or 8 μm (e.g., as represented by a bi- or higher-modal size distribution). The differently sized fiber sets can contain the same or different active compound(s).

In some embodiments, fibers of the packaging material can be used directly in their fibrous form when packaging food or other contents. The fibers can be added as a reinforcement or other discrete phase to a continuous polymer phase, for example which continuous polymer phase does not contain the encapsulated powder and/or active compounds according to the disclosure. The polymers for the continuous phase can be the same or different as those above for the fiber matrix. Fibers made by electrospinning or other process can be used as a reinforcement to enhance the properties of plastics in packaging or can be used as a coating layer to packaging materials. For example, fibers can be deposited on the packaging material substrate as mono- and multilayers. Fibers, whether incorporated into a polymer/plastic matrix or used as a surface coating thereon, can provide favorable release properties to their active compounds. Selection or other control of the fiber diameter can be used to control release properties of the active compound within the fiber, for example by adjusting the surface area-to-volume ratio of the fiber, where smaller diameters increase release rate and higher diameters reduce release rate. Thus, the fibrous form of the packaging material provides two independently selectable means to control the release rate of the active compound, including (1) the selection of a particular encapsulating material (e.g., with relative degrees of water solubility) and (2) the selection of particular fiber diameter, as described above. The fibrous form additionally allows control over color or other appearance properties of the packaging material. Active compounds such as polyphenols and others accord to the disclosure can have distinct color that might be undesirable to impart to a corresponding packaging material (e.g., brown), and such color can be apparent when the active compound (e.g., as an encapsulated powder) is evenly distributed throughout a continuous material such as a polymer. By localizing the active compound/encapsulated powder to discrete fibers, the small size of the fibers can limit the appearance of the distinct color to the product, rendering the product substantially transparent (e.g., based on the polymer used for the primary packaging material). Additionally, the fibers can include a colorant or pigment (e.g., white) to mask the natural color of the active compounds.

In various embodiments, the active food packaging material is in the form of a film. Films suitably can have a thickness 10 μm to 1000 μm or 50 μm to 500 μm. In some embodiments, the base material for the film is the polymeric matrix of the packaging material, and the encapsulated powder is continuously distributed throughout the matrix. In other embodiments, the base material for the film is a polymer such as those used for the polymeric matrix, and the packaging material is in the form of fibers within or on the film. For example, electrospun fibers can be applied as mono- and multilayers, layer-by-layer assemblies, and similar structures in packaging materials.

In another aspect and as further shown in FIG. 1, the disclosure relates to an actively packaged food item 400. Such an article 400 generally includes a food item 410 and an active food packaging material 300 according to any of the disclosed embodiments in contact with the food item 410. The active food packaging material 300 is generally in direct physical contact with at least a portion of the food item 410. For example, the active packaging material 300 can be in the form of a flexible material (e.g., fiber and/or film) to wrap or otherwise contain the food item 410. The active packaging material 300 can be in the form of a rigid container with the food item 410 therein. The packaging material 300 can be in the form of a film or lining on the food-contacting surface of another packaging material (not shown), for example cardboard or other paper-based product, another polymer material (e.g., without encapsulated powder and active compounds therein).

The food item contained in the package is not particularly limited and can include fresh foods, processed foods, ready-to-eat foods, etc. The general aim of using active packaging with antibacterial properties is to enhance the shelf-life of food products by preventing the formation and proliferation of common food pathogen microorganisms (e.g., one or more of *Escherichia coli, Salmonella enterica; Staphylococcus aureus*). Examples of suitable packaged foods include meats such as beef, poultry, fish, pork, sausage, etc., fruits, vegetables, and cheeses. In some embodiments, meats are preferably packaged with an active packaging material including one or more lipids as an active compound. Similarly, in some embodiments, fruits and/or vegetables are preferably packaged with an active packaging material including active compound one or more antioxidants or vitamins as an active compound.

EXAMPLES

The examples illustrate the disclosed articles, compositions, and methods, but are not intended to limit the scope of any claims thereto.

Example 1—Green Extraction of Antioxidants from Cherry Pit

Example 1 illustrates extraction methods for recovering antioxidant materials from lignocellulosic by-product biomass, in particular cherry pits.

Anthocyanins and polyphenolic compounds in plant resources contribute to total antioxidant activity. Some of these compounds are shown to have antioxidant ability to prevent the oxidation of an oxidizable substrate which could reduce the risk of cancer, cardiovascular disease and other degenerative diseases. Polyphenolic compounds are divided to subgroups such as flavonoids, stilbenes, lignans and phenolic acids. These compounds are present in several edible and non-edible food sources such as different types of fruits, vegetables, and seeds.

Fruits are an essential source of phenolic compounds with high antioxidant capacity. Cherries have high phenolic compounds with anti-inflammatory properties which could be used to reduce risk of cancer and diabetes and cardiovascular diseases. Industrial cherry processes produce huge amounts of by-products e.g. cherry pomace, tar, and pits.

Depending on the process, cherry pomace (skin and flesh) can comprise 15-28% of the initial fruit and the cherry pit can account for 7-15% of the whole fruit. Currently, these by-products are being used as animal feed, fuel, or preparation of activated carbons, although ultimately most is rendered as waste. Nonetheless, such biomasses are rich in valuable intracellular compounds, for example polyphenols with antioxidant properties, and represent a viable, untapped opportunity to realize economic and social benefits—once recovered and efficiently valorized.

Environmentally friendly extraction methods include pressure assisted, ultrasonic, and microwave techniques, with or without using solvents. There are several solvents that can be used in the extraction. A mixture of water-alcohol is an efficient solvent due to its economical aspects, non-toxicity, and it GRAS (Generally Recognized As Safe) character.

The example demonstrates the extraction of phenolic compounds from cherry pits using a high-temperature and high-pressure extraction technique. For this purpose, samples were categorized into three different sizes (below 420 μm, above 841 μm, and between 420 μm and 841 μm) and extracted at room temperature to identify a suitable particle size ratio of water to ethanol for the extraction solvent. In the second step, samples were extracted in a high pressure/high temperature (HPHT) reactor varying extraction time and temperatures. Samples were analyzed for their total polyphenolics, total flavonoids and antiradical power. Finally, the extracts were characterized through High Performance Liquid Chromatography (HPLC) to determine the phenolic compounds profile and to investigate the effect of extraction parameters on each single phenolic compound.

The best extract in terms of total phenolic compounds with the highest antioxidant properties was then used for the encapsulation process. The encapsulation process of antioxidants is an efficient approach to improve their physical and chemical stability, to protect them from interaction with the other components of complex matrices, as well as to increase their bioactivity when compared to synthetic and non-encapsulated antioxidants. It will also increase the concentration of bioactive compounds, promote their homogeneous distribution in complex matrices, and facilitate the storage and transportation of these compounds in the powder form instead of liquid form. For the encapsulation process, a spray dryer was used with inulin/maltodextrin as the covering agent. Inulin is an interesting coating agent for food applications being a dietary fiber that exhibits prebiotic effects, suitable also for diabetic food. Replacing conventional coating agents, such as maltodextrin or gum arabic, with a healthy compound such as inulin that can add a higher value to the product. The effect of inlet temperature and the content of covering agent on encapsulation efficiency was investigated. The protected bioactive compounds in the form of powder can be incorporated into a biodegradable material such as PLLA to fabricate active packaging with antibacterial properties.

Reagents: Folin-Ciocalteau reagent, catechin, sodium carbonate, ethanol, 2,2-diphenyl-1-picryl-hydrazyl-hydrate (DPPH), aluminum chloride, sodium hydroxide, caffeic acid, gallic acid and 1,8-diazabicyclo (5.4.0) undec-7-ene, 98% were purchased from Sigma Aldrich. Cherry pits were provided by a cherry processor company located in Traverse City, Michigan Sample Preparation: A first batch of experiments was performed using conventional solid-liquid extraction at room temperature using two different solvents: 1) 100% ethanol and 2) water:ethanol (50:50 v/v). Cherry pits were dried for 24 hours at 60° C. Then, they were ground to coarse particles using ball mill SPEX 8000M. Afterward, they were ground to fine particles for 20 seconds. Fine powders were obtained using 20 and 40 mesh size (i.e., 841 μm pass and 420 μm pass, respectively). The extraction time was 24 hours and the solid to liquid ratio was fixed at S/L=0.1 g/mL. The extracts were filtered using a vacuum filter with a 450 nm membrane and the liquid was stored in in close container at 4° C. prior analysis. Tests on the extracts were performed in the following 14 hours. Total Phenolic (TP) compounds of the extracts were measured using Folin-Ciocalteu assay. The results of the TP content are shown in Table 1.

TABLE 1

Total Phenolic of Cherry Pits

| Sample | Solvent | Mesh Size | TP Yield ($mg_{Gallic\ Acid\ Equivalent}/g_{Dried\ Biomass}$) |
|---|---|---|---|
| Dried cherry pits | 100% Ethanol | 20 | 2.14 |
| | 100% Ethanol | 40 < x < 20 | 0.80 |
| | 100% Ethanol | 40 | 2.49 |
| | Water:ethanol (50:50 v/v) | 20 | 2.76 |
| | Water:ethanol (50:50 v/v) | 40 < x < 20 | 1.47 |
| | Water:ethanol (50:50 v/v) | 40 | 3.47 |

Based on the results from Table 1, water: ethanol (50:50 v/v) was selected as the solvent, and 40 mesh (420 μm pass) was selected for the size of the powders for a non-conventional extraction. Extraction tests were performed in a high pressure—high temperature reactor model 4560 (PARR Instrument Company, Moline, IL, USA), which contained appropriate valves to allow introduction and removal of gasses inside the reaction chamber. In order to avoid the effect of an extractive atmosphere for phenolic oxidation during the experiments, as an additional operative condition, all tests were carried out under nitrogen atmosphere by flushing nitrogen through the reactor for 2 min. The reactor was hermetically closed; hence the pressure was directly proportional to the temperature. High temperatures decrease the viscosity of liquid solvents, thus allowing better penetration of matrix particles and enhancing extraction. Increased temperatures can also disrupt the strong solute—matrix interactions caused by van der Waals forces, hydrogen bonding, and dipole attractions between the solute molecules and the active sites on the matrix. The use of pressure should facilitate extractions from samples in which the analytes have been trapped in matrix pores. The pressure forces the solvent into areas of the matrices that would not normally be reached by solvents under atmospheric conditions.

Six extractions were performed by varying the extraction times (30 and 135 minutes) and temperatures (100, 125, 150° C.). The solid to liquid ratio was fixed at S/L=0.1 g/mL. Briefly, 30 grams of fine cherry pit powder and 300 ml of solvent was mixed in a HPHT reactor. After the extraction, the reactor was cooled down to room temperature. The mixture was then filtered using a vacuum filter with a 450 nm membrane and the liquid was stored in in close container at 4° C. prior analysis. Tests on the extracts were performed in the following 14 hours.

Ash Content: Ash content of the cherry pits was measured following TAPPI-T 211 om-93 method. First, crucibles were dried to a constant weight using muffle furnace at 250° C. Then after cooling, about 1 g of oven dried sample (dried at 100° C. for 1 h) was transferred to a pre-weighed crucible and placed in the furnace. The temperature was initially increased to 250° C. and after 15 min increased to 525° C. which was kept at that temperature for 4 hours. After cooling to about 100° C., samples were transferred into a desiccator before measuring their weights. Ash content was calculated based on the following equation: Ash content (%)=(weight of Ash(g)/weight of the oven dried sample(g))×100.

Moisture Content: Moisture content of samples was measured using the following method: A small amount of TAR and cherry pit samples were weighed and transferred into the oven dried pan and placed into the oven at 105° C. for at least 7 hours to dry completely. Then the oven dried samples were weighed, and the moisture content was measured through the following equation: % Moisture Content=(Wet weight−oven dried weight)/(oven dried weight)×100

Lignin and Sugar Content: After measuring the moisture content, 0.1 g of oven-dried sample were transferred into clean and dry glass vials. One mL of 72% of sulfuric acid was added into the samples. Prepared solutions were stirred every 10 mins during the next 1 hour while placed into the water bath at 30° C. Then 28 mL of water were added to the samples and they placed into the autoclave for 1 hour at 125° C. to precipitate the lignin from samples. After autoclave, about 0.5 mL of samples were separated for HPLC analysis and the rest of them were filtered to measure the amount of lignin. Analysis of sugars (xylose and glucose) were performed using HPLC with refractive index (RI).

The results of the various compositional analyses are shown in Table 2.

TABLE 2

Compositional Analysis

| Sample | Moisture (%) | Lignin (%) | Glucan (%) | Xylan (%) | Ash (%) | Heat Capacity Cp (J/g° C.) |
|---|---|---|---|---|---|---|
| Cherry pit | 6.3 | 32.8 | 43.1 | 5.6 | 1.2 | 0.45 |

Quantification of Total Polyphenolics (TPP), Total Flavonoids (TF), and Their Antiradical Power (ARP): Total polyphenols (TPP) content of the extracts were measured using Folin-Ciocalteu assay. For this test, 4.8 mL of deionized $H_2O$ and 0.2 mL of diluted sample were mixed in a test tube. Then, 0.5 ml of Folin-Ciocalteu reagent and 1 mL of $Na_2CO_3$ saturated solution were added. The alkaline environment improves the solubilization. Then, 3.5 mL of deionized water was added to rich a final volume of 10 mL. Samples were kept in the dark place for 1 hour at room temperature. The wavelength of 725 was used for the assessment of TPP using Shimadzu UV-Vis Spectrophotometer. TPP content was calibrated using standard solution of gallic acid. TPP is expressed as gallic acid equivalent per weight of dried biomass ($mg_{GAE}/g_{DB}$).

Flavonoids have several potential health benefits due, in part, to their antioxidant activity and, recently, research on natural antioxidants, including flavonoids, has increased actively in various fields. Besides, flavonoids are one of the major groups of phenolics present in cherry fruits and in their byproducts and have been proposed as markers for biochemical characterization of fruit varieties. For all these reasons, in this work, total flavonoids content was selected as one of the dependent variables and its trend was studied as a function of extraction temperature and contact time. Total flavonoids (TF) were measured separately according to the colorimetric method and expressed as milligrams of catechin equivalents (CE) per gram of dried biomass (DB) ($mg_{CE}/g_{DB}$). Briefly, 0.25 ml of extract was mixed with 1.25 ml of deionized water and 0.075 ml of 5% (w/w) sodium nitrite solution. After 5 min 0.15 ml of 10% (w/w) aluminum chloride was added to the solution. After 6 minutes, 0.5 ml of 1 M sodium hydroxide was added. The final volume of solution was increased to 3 ml, DI water. The UV spectrophotometer was used at wavelength of 510 nm to measure the absorption. The calibration curve for this measurement was established from standard solution of catechin with predefined concentrations.

Antiradical power (ARP) were also measured using DPPH assay. 2.3 mg of DPPH was solved in 100 mL of ethanol. Serial dilutions of samples were prepared as indicated in the assay. 3.9 mLof DPPH solution and 0.1 mL of each dilutes solution were added. Then, samples were incubated in dark conditions for 1 hour at room temperature. Original DPPH and samples absorbance were recorded in wavelength of 515 nm. The ratio of mLextract/mgDPPH was plotted against % DPPH, calculated as the ratio of final (after 1 h) to initial concentrations of DPPH. The amount of extract necessary to decrease the initial DPPH concentration by 50% (EC50 in mLextract/mgDPPH) was determined from the resulting exponential equation. Finally, ARP was defined as 1/EC50 (mgDPPH/mLextract).

Figure 2:
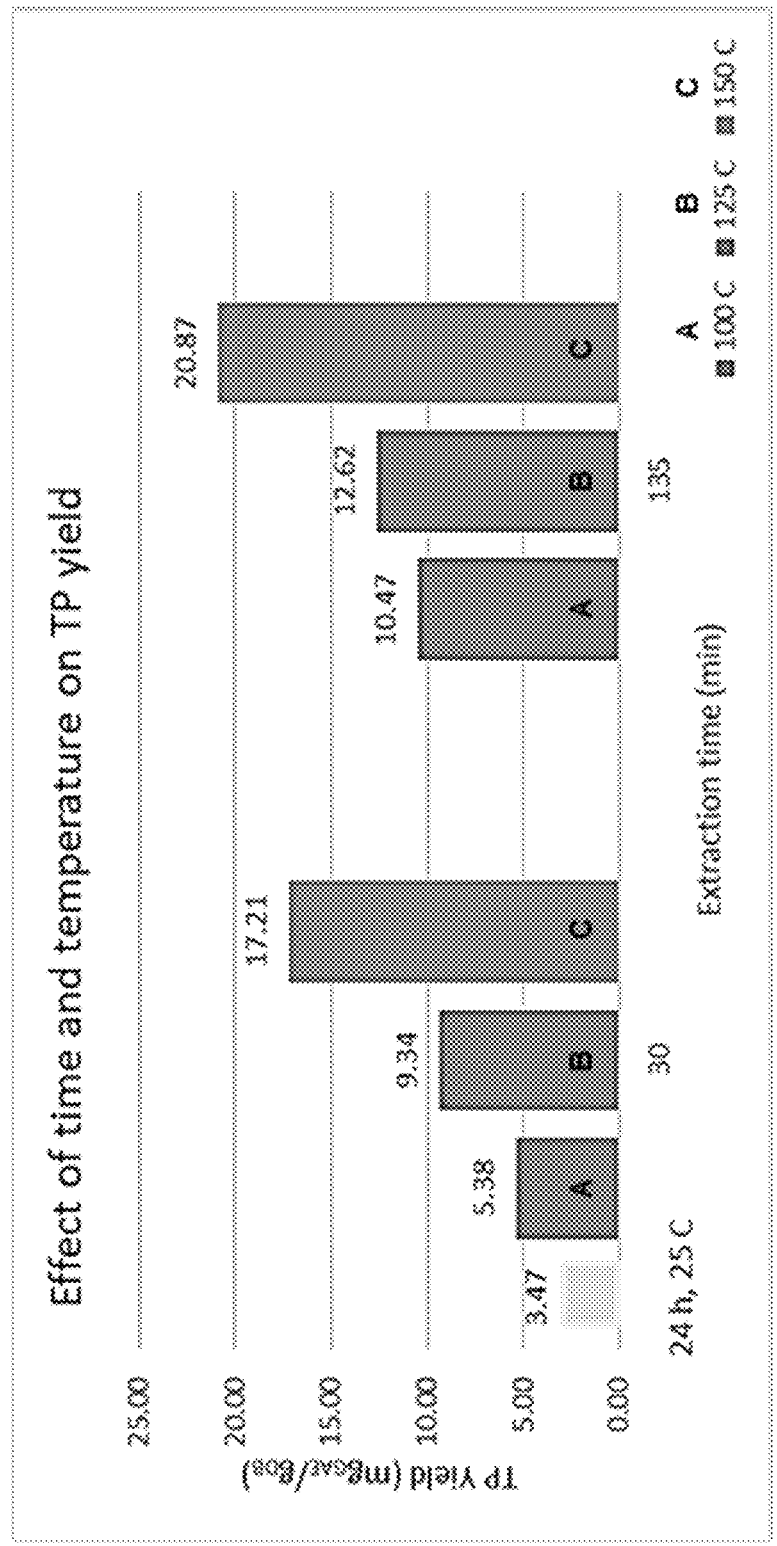
FIG. 2 includes a graph showing total polyphenolics (TPP) in a cherry pit extract according to the disclosure.
Figure 3:
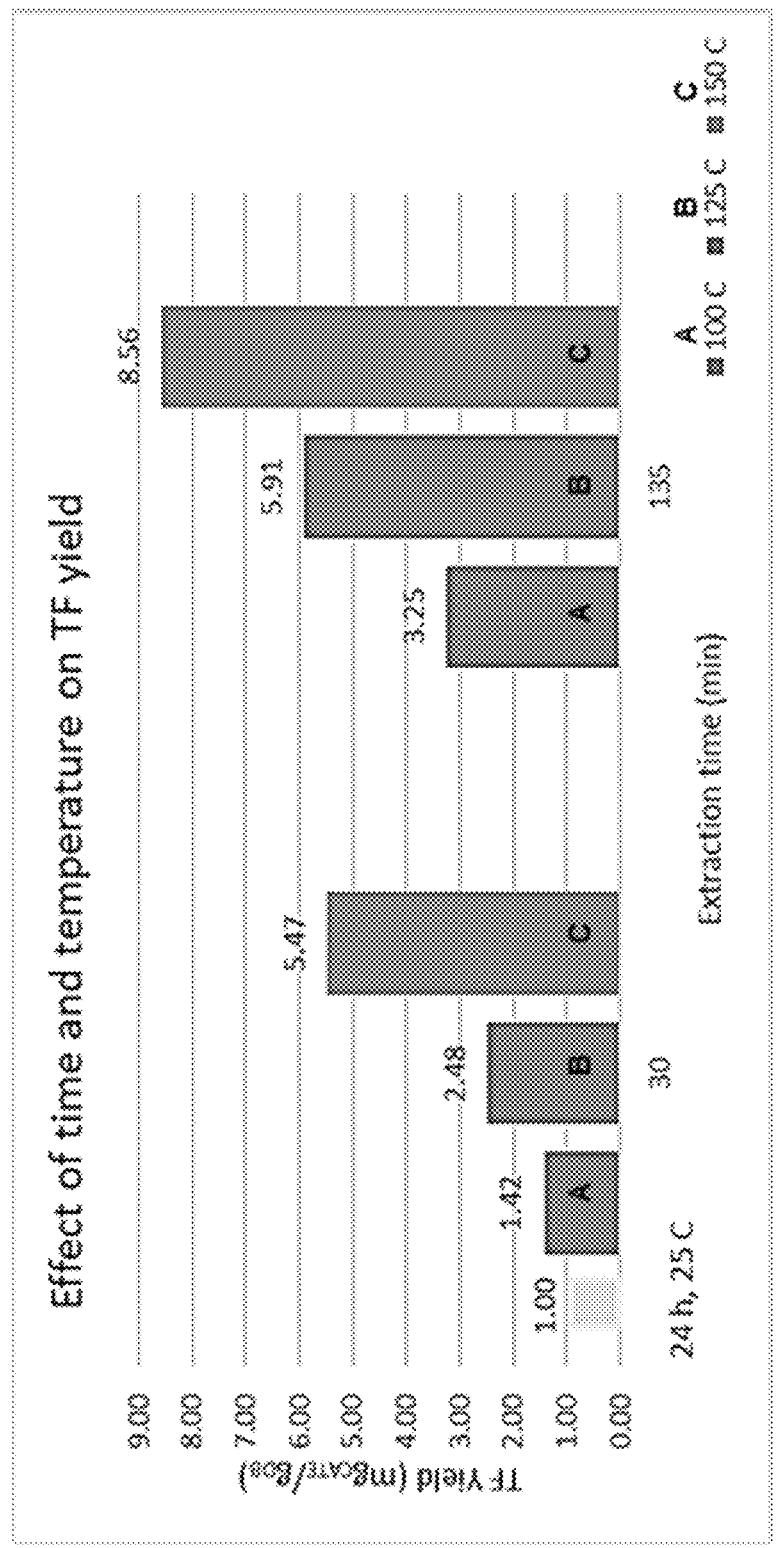
FIG. 3 includes a graph showing total flavonoids (TF) in a cherry pit extract according to the disclosure.
Figure 4:
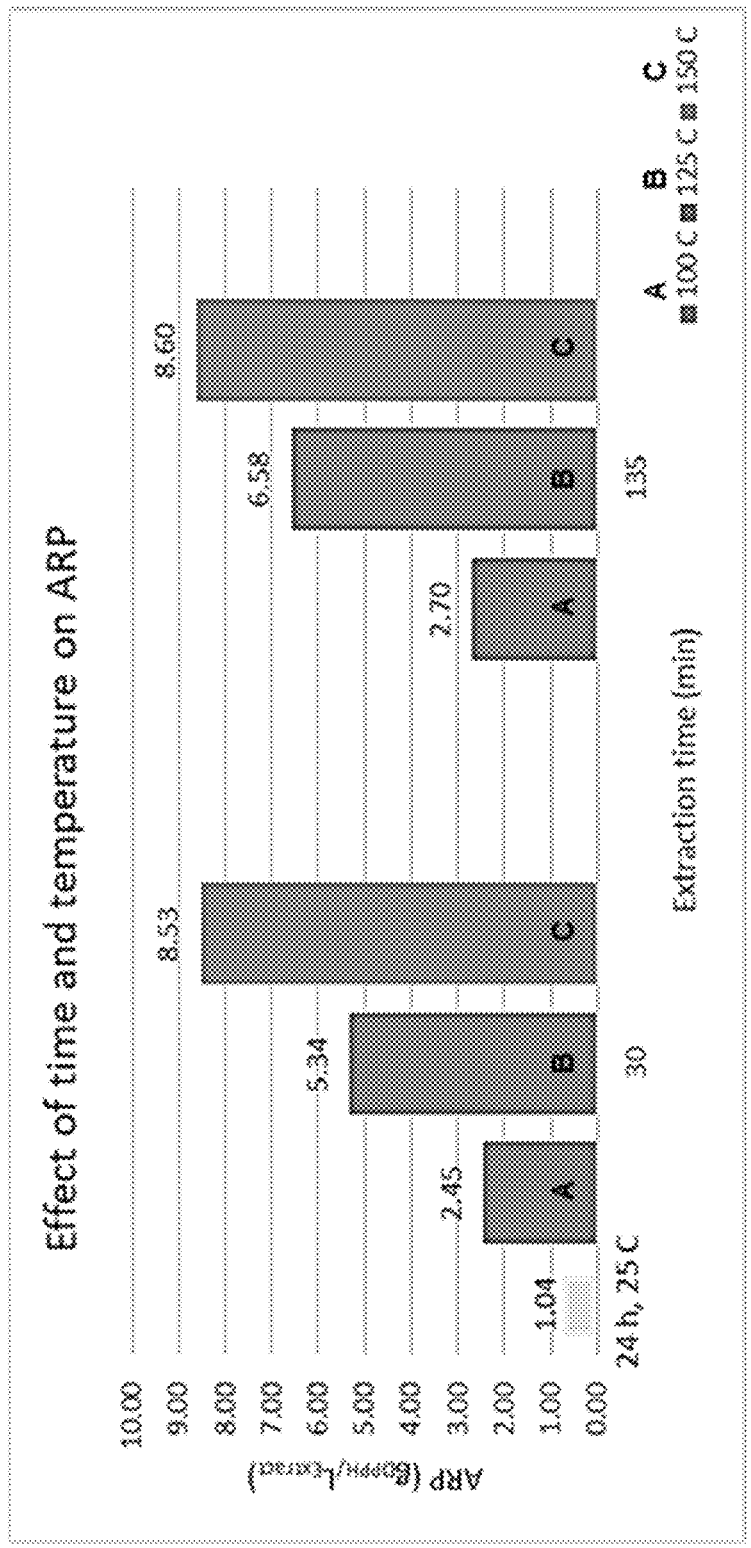
FIG. 4 includes a graph showing antiradical power (ARP) of the polyphenolics and flavonoids in a cherry pit extract according to the disclosure.

FIGS. 2-4 illustrate results of the TPP, TF, and ARP analyses, respectively. The result confirmed that higher temperature and time resulted to higher content of TPP, TF and ARP. The effect of temperature was more evident than time on TPP, TF and ARP. For example, at 30 minutes of extraction and increasing the extraction time from 100° C. to 150° C., TP increased 220% and TF enhanced 285%. While when the extraction was lasted for 135 minutes, the rise of temperate from 100° C. to 150° C. resulted to an increase of 99% for TP and 163% for TF. Elevated temperatures improve the efficiency of extraction due to enhanced diffusion rate and solubility of analytes in solvents. Higher temperature, along with a simultaneous positive effect of reaction pressure, was more efficient for TPP extraction from cherry pits in a nitrogen atmosphere. Antiradical power of the extracts remained almost constant when time increase from 30 to 135 minutes at 150° C. The highest extraction pressure of 7.4 bar was noticed at 135 minutes and 150° C.

Example 2—Active Packaging

Example 2 illustrates a means for incorporating antioxidant compounds into a polymer matrix via electrospinning, which provide a material that can be used as an active packaging material for food items. Active packaging is a package system that deliberately incorporates components that release or absorb substances into or from the packaged food or the environment surrounding the food to extend the shelf-life, to maintain or to improve the condition of the packaged food. Such a packaging system plays an active role in food preservation and quality during the marketing process. Antioxidants have several health benefits such as antimicrobial properties, and they can be incorporated to the packaging materials to exert their functional activities. The controlled release of antioxidants from active packaging systems is desirable and depends on the incorporation technique. Electrospinning is a useful technique to fabricate scaffolds with acceptable mechanical and biological properties.

This example illustrates the efficiency of the electrospinning process to incorporate an active compound (quercetin) with antimicrobial properties and to fabricate active scaffolds using poly (L-lactic acid) (PLLA). PLLA is a biomass-oriented polyester, biodegradable, non-toxic, with the possibility to be electrospuned that possess acceptable mechanical properties to be used in food packaging. To this purpose, three different concentrations of quercetin were tested. Quercetin was mixed with the polymer solution before electrospinning process. The antimicrobial effect of quercetin against *Escherichia coli* and *Saccharomyces cerevisiae* was assessed at three levels. Physical and chemical characteristics of active scaffolds were determined in terms of mechanical properties, fiber dimeters, and degradation rate, and the release of quercetin was also evaluated. Quercetin is a single phenolic compound with antioxidant properties, but the illustrated method can be applied to natural extracts from cherry or other by-products from fruit processes, which extracts can include a mixture of different phenolic compounds with antioxidant properties.

Materials and Methods: For fabrication of the scaffolds, an electrospinning apparatus consisting of a high voltage power supply (PCM series, Spellman, NY, USA) was used for charging the polymer solution, a grounded aluminum roto-translating drum (4 mm outer diameter and 13 cm in length) was used for collecting fibers, and a syringe pump (KDS-100, KD Scientific, Holliston, MA, USA) was used for controlling feed flow rate. Rotation was at 750 rpm and translation velocity at 1000 mm/min. The fluid was pushed out from the syringe with a flow rate of 1.1 mL/h, throughout a 0.25 mm diameter needle with a potential difference of 17 kV. All the samples were obtained using about 1.5 mL of initial solution. The polymer solution was prepared with Poly(L-lactide), PLLA, in 1,1,1,3,3,3-Hexafluoro-2-propanol (HFP) 20% (w/v). Three different volumes of quercetin dihydrate in ethanol (5.5 mg/mL) were added to obtain three different quercetin/polymer ratio: 1:4, 1:8, 1:16. The pre-polymer solution was then electrospun and the collected samples were dried over-night in a desiccator. The mechanical properties of the scaffolds were measured using uniaxial tensile test. The release of quercetin in PBS solution from the scaffold was measured using spectrophotometer at different times up to 75 days. Growth inhibition activity of quercetin against *Escherichia coli* and *Saccharomyces cerevisiae* was also assessed.

Figure 5:
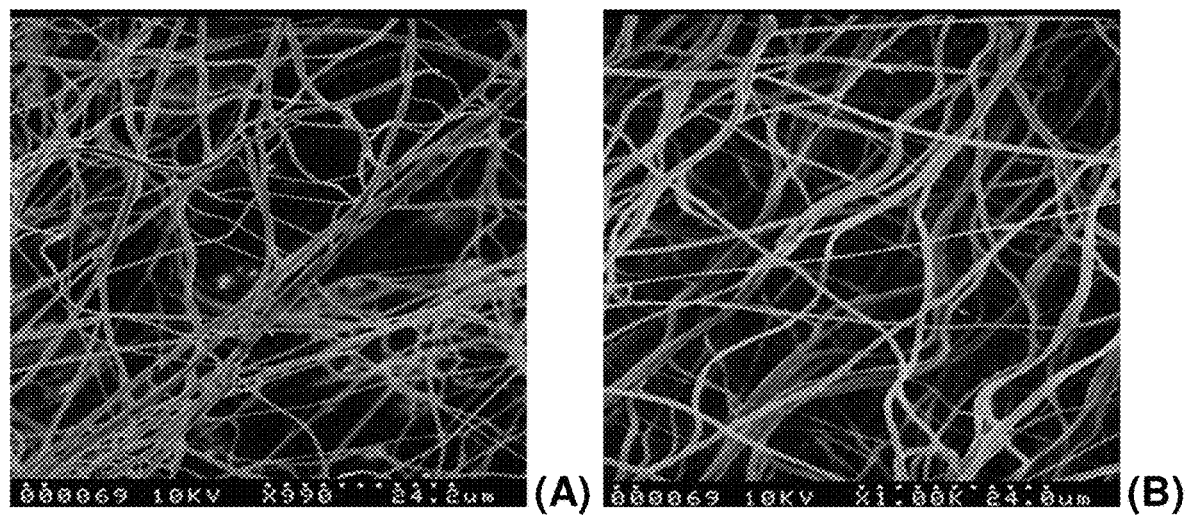
FIG. 5 includes SEM images for electrospun PLLA (A) and PLLA loaded with quercetin (B).
Figure 6:
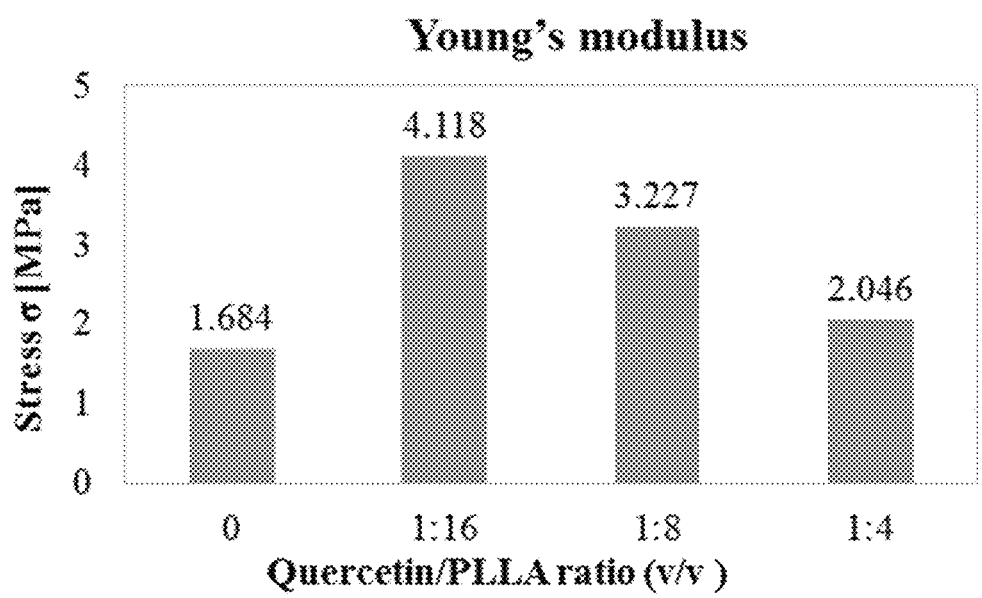
FIG. 6 includes a graph showing the Young's modulus of electrospun scaffolds of PLLA with and without quercetin as a function of the quercetin:PLLA ratio.
Figure 7:
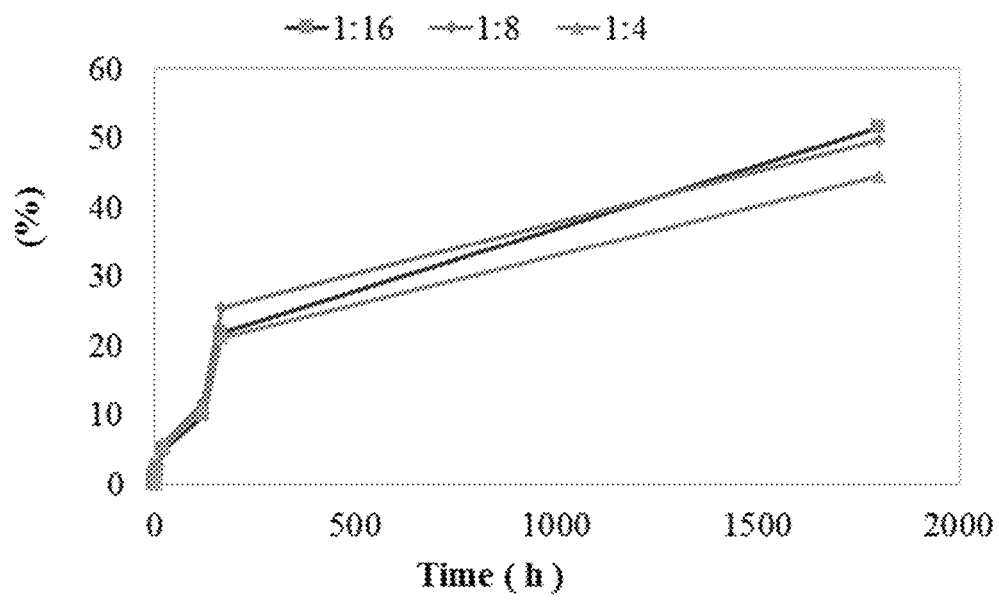
FIG. 7 includes graphs showing the quercetin release profile from electrospun scaffolds of PLLA at 4° C. (A) and at 20° C. (B) as a function of the quercetin:PLLA ratio (1:16 (square), 1:8 (diamond), and 1:4 (triangle)).
Figure 7:
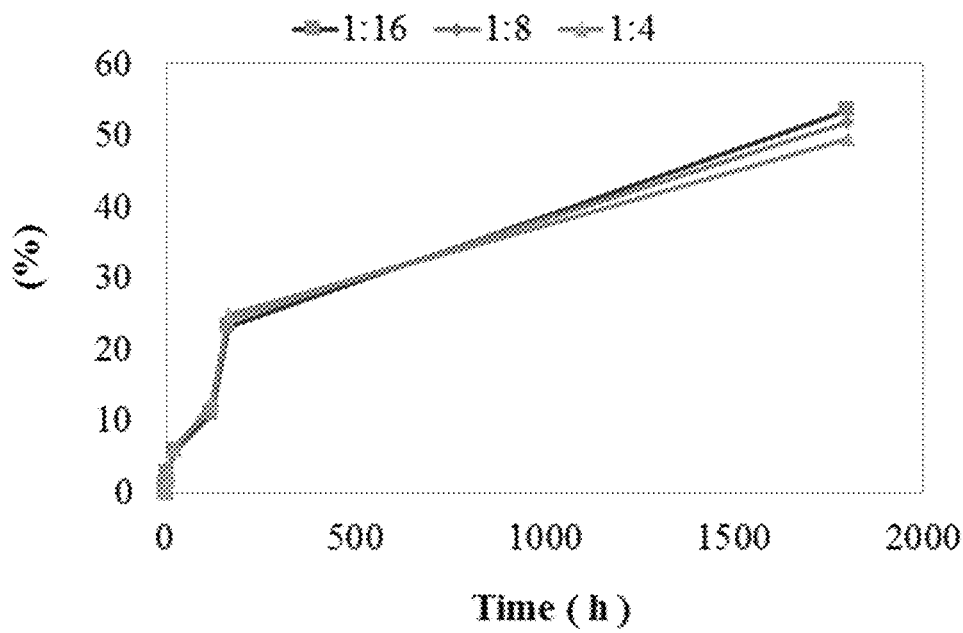
Figure 8:
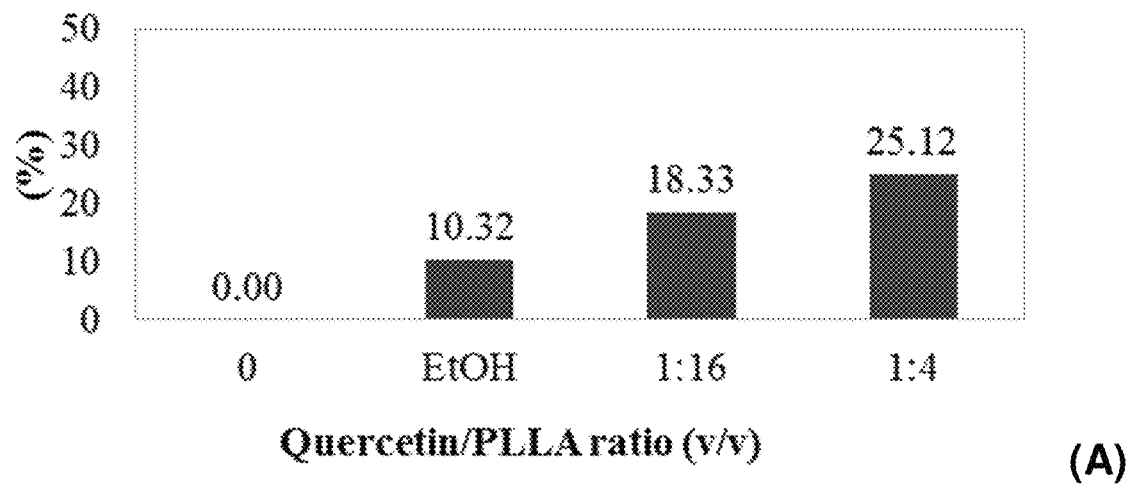
FIG. 8 includes graphs showing the growth inhibition of *E. coli* (A) and *S. cerevisiae* (B) as a function of the quercetin:PLLA ratio.
Figure 8:
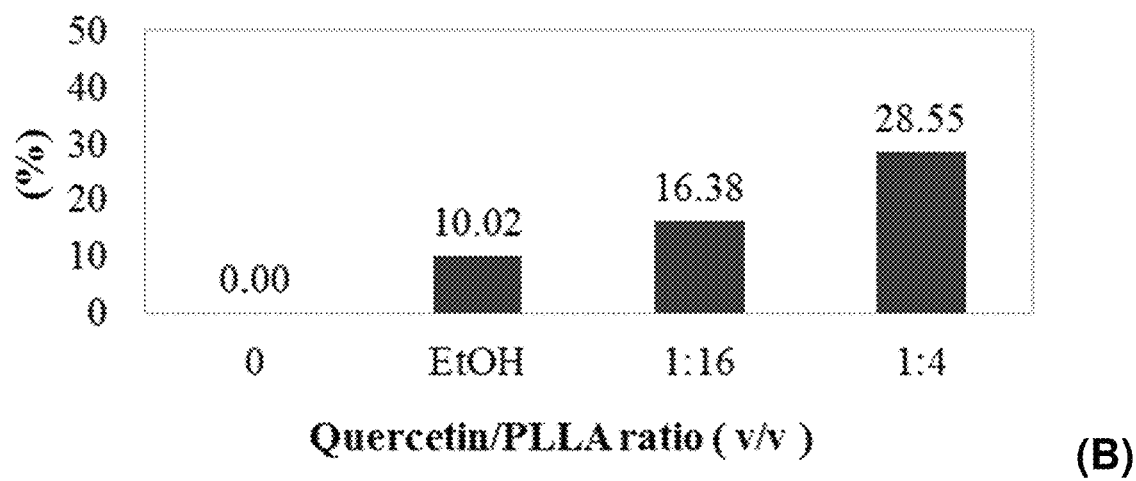

Results: Scanning Electron Microscopy analysis (FIG. 5) of electrospun scaffold showed randomly oriented fibers diameter varying from 0.88 to 1.23 μm. Fiber diameters were augmented by increasing the quantity of quercetin loaded. Fibers without quercetin had an average diameter of about 0.88 μm. Fibers with quercetin had average diameters of about 0.96 μm, 1.10 μm, and 1.23 μm for quercetin:PLLA ratios of 1:16, 1:8, and 1:4, respectively. The values of Young's modulus (FIG. 6) and elongation percentage (not shown) of the scaffold with and without quercetin were statistically different and reached a maximum of 4.118 MPa and 93%, respectively, when lower amount of quercetin was used, respectively. The amount of quercetin released exhibited a similar trend for all three samples and reached values of 50% after 75 days of incubation at both 4° C. and 20° C. (FIG. 7). In vitro tests demonstrated the antimicrobial activity of quercetin released from PLLA scaffolds (FIG. 8). *E. coli* was reduced up to 25.1%, and *S. cerevisiae* was reduced up to 28.5% when they were in contact with the scaffold containing quercetin at a ratio of 1:4 (v/v).

This example demonstrates that antioxidant active scaffolds fabricated by electrospinning have good mechanical properties, and further that quercetin, used as an illustrative antimicrobial agent, was released in a controlled manner during the storage time up to 75 days. *E. coli* growth was reduced up to 25% and *S. cerevisiae* up to 28% when the highest concentration of quercetin was added to the scaffold. Accordingly, electrospinning can be used to produce scaffolds with antimicrobial properties that are suitable for food packaging.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the apparatus, compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for extracting active compounds from a food process waste, the method comprising:
    (a) providing a feed slurry comprising (i) a liquid medium comprising water and (ii) a solid food process waste dispersed in the liquid medium, the solid food process waste comprising an active compound selected from the group consisting of polyphenols, flavonoids, o-diphenols, anthocyanins, phenolic acids, and combinations thereof;
    (b) subjecting the feed slurry to a temperature above 100° C. at a pressure sufficiently high to prevent boiling of the liquid medium for a time sufficient to extract the active compound from the solid food process waste and into the liquid medium; and
    (c) separating solid food process waste from the liquid medium containing the active compound, thereby forming an extract comprising the liquid medium and the active compound dissolved therein, wherein the extract has a total polyphenolic recovery in a range of 0.2 wt. % to 8 wt. %, expressed on a basis of gallic acid equivalents (GAE) per dry weight of original solid food process waste.

2. The method of claim 1, wherein the liquid medium further comprises a water-miscible organic solvent.

3. The method of claim 1, wherein the solid food process waste comprises at least one of pomace and pits from a fruit selected from the group consisting of cherries, apples, apricots, peaches, grapes, olives, avocados, mangos, tomatoes, carrots, citrus fruits, bananas, agave, and combinations thereof.

4. The method of claim 1, wherein the solid food process waste is in powder form having a size less than 420 µm.

5. The method of claim 1, wherein the solid food process waste is present in the feed slurry in an amount in a range from 5 wt. % to 50 wt. %.

6. The method of claim 2, wherein:
    the solid food process waste comprises cherry pits in powder form;
    the water is present in the liquid medium in an amount ranging from 30 wt. % to 70 wt. % relative to total liquid content of the liquid medium;
    the water-miscible organic solvent comprises ethanol and is present in the liquid medium in an amount ranging from 30 wt. % to 70 wt. % relative to total liquid content of the liquid medium; and
    the temperature in part (b) is in a range of 120° C. to 200° C.

7. A method for processing a plurality of different food process waste feedstocks, the method comprising:
    providing (i) a first solid food process waste comprising a first active compound selected from the group consisting of polyphenols, flavonoids, o-diphenols, anthocyanins, phenolic acids, and combinations thereof, and (ii) a second solid food process waste different from the first solid food process waste and comprising a second active compound selected from the group consisting of polyphenols, flavonoids, o-diphenols, anthocyanins, phenolic acids, and combinations thereof, wherein the first solid food process waste and the second solid food process waste are independently selected to be different members from the group consisting of cherry pits, cherry pomace, and cherry tar;
    performing a first extraction method to extract the first solid food process waste, the first extraction method comprising:
        (a1) providing a first feed slurry comprising (i) a first liquid medium comprising water and (ii) the first solid food process waste dispersed in the first liquid medium,
        (b1) subjecting the first feed slurry to a temperature above 100° C. at a pressure sufficiently high to prevent boiling of the first liquid medium for a time sufficient to extract the first active compound from the first solid food process waste and into the first liquid medium,
        (c1) separating the first solid food process waste from the first liquid medium containing the first active compound, thereby forming (i) a first extract comprising the first liquid medium and the first active compound dissolved therein, and (ii) a first exhausted solid comprising remaining first solid food process waste after extraction;
    performing a second extraction method to extract the second solid food process waste, the second extraction method comprising:
        (a2) providing a second feed slurry comprising (i) a second liquid medium comprising water and (ii) the second solid food process waste dispersed in the second liquid medium,
        (b2) subjecting the second feed slurry to a temperature above 100° C. at a pressure sufficiently high to prevent boiling of the second liquid medium for a time sufficient to extract the second active compound from the second solid food process waste and into the second liquid medium,
        (c2) separating the second solid food process waste from the second liquid medium containing the second active compound, thereby forming (i) Op a second extract comprising the second liquid medium and the second active compound dissolved therein, and al {iv} a second exhausted solid comprising remaining second solid food process waste after extraction; and drying and encapsulating independently each of the first extract and the second extract, thereby forming (i) a first encapsulated powder comprising a first encapsulating matrix and the first active compound within and distributed throughout the first encapsulating matrix, and (ii) a second encapsulated powder comprising a second encapsulating matrix and the second active compound within and distributed throughout the second encapsulating matrix.

8. The method of claim 7, further comprising:

incorporating at least one of the first encapsulated powder and the second encapsulated powder into a product selected from the group consisting of an active food packaging, an antibacterial coating, a cosmetic formulation, and a functional food product.

9. The method of claim 7, further comprising:

performing pyrolysis on at least one of the first exhausted solid and the second exhausted solid, thereby forming a biofuel.

10. The method of claim 7, wherein:

the first liquid medium and the second liquid medium each further comprise a water-miscible organic solvent;

the first solid food process waste is present in the first feed slurry in an amount in a range from 5 wt. % to 50 wt. %;

the second solid food process waste is present in the second feed slurry in an amount in a range from 5 wt. % to 50 wt. %;

the first encapsulating matrix and the second encapsulating matrix each independently comprise an oligosaccharide selected from fructooligosaccharides (FOS), galactooligosaccharides (GOS), and combinations thereof;

the temperature in part (b1) and part (b2) is in a range of 120° C. to 250° C.;

the water is present in each of the first liquid medium and the second liquid medium in an amount independently ranging from 10 wt. % to 90 wt. % relative to total liquid content of the first liquid medium or the second liquid medium, respectively; and the water-miscible organic solvent is present in each of the first liquid medium and the second liquid medium in an amount independently ranging from 10 wt. % to 90 wt. % relative to total liquid content of the first liquid medium or the second liquid medium, respectively.

11. A method for extracting active compounds from a food process waste, the method comprising:

(a) providing a feed slurry comprising (i) a liquid medium comprising water and ethanol and (ii) a solid food process waste dispersed in the liquid medium, wherein:

the water is present in the liquid medium in an amount ranging from 30 wt. % to 70 wt. % relative to total liquid content of the liquid medium, the ethanol is present in the liquid medium in an amount ranging from 30 wt. % to 70 wt. % relative to total liquid content of the liquid medium, the solid food process waste comprises (A) cherry pits in powder form, and (B) an active compound selected from the group consisting of polyphenols, flavonoids, o-diphenols, anthocyanins, phenolic acids, and combinations thereof;

(b) subjecting the feed slurry to a temperature in a range of 120° C. to 200° C. at a pressure sufficiently high to prevent boiling of the liquid medium for a time sufficient to extract the active compound from the solid food process waste and into the liquid medium; and (c) separating solid food process waste from the liquid medium containing the active compound, thereby forming an extract comprising the liquid medium and the active compound dissolved therein.

12. The method of claim 11, wherein:

the solid food process waste is in powder form having a size less than 420 µm; and the solid food process waste is present in the feed slurry in an amount in a range from 5 wt. % to 50 wt. %.

13. The method of claim 2, wherein:

the water is present in the liquid medium in an amount ranging from 10 wt. % to 90 wt. % relative to total liquid content of the liquid medium;

the water-miscible organic solvent is present in the liquid medium in an amount ranging from 10 wt. % to 90 wt. % relative to total liquid content of the liquid medium;

the solid food process waste is present in the feed slurry in an amount in a range from 5 wt. % to 50 wt. %; and the temperature in part (b) is in a range of 120° C. to 250° C.

14. The method of claim 1, wherein the solid food process waste comprises at least one of cherry pomace and cherry pits.

15. The method of claim 1, wherein the solid food process waste comprises apple pomace.

16. The method of claim 1, wherein the solid food process waste comprises grape pomace.

17. The method of claim 1, wherein the solid food process waste comprises coffee food waste.

18. The method of claim 13, wherein the solid food process waste comprises at least one of cherry pomace and cherry pits.

19. The method of claim 13, wherein the solid food process waste comprises at least one of apple pomace and grape pomace.

20. The method of claim 13, wherein the solid food process waste comprises coffee food waste.

* * * * *